United States Patent
Kao et al.

(10) Patent No.: US 7,197,187 B2
(45) Date of Patent: Mar. 27, 2007

(54) REDUCTION OF DATA WITH LIMITED DISTORTION OF IMAGE FORMED OF THE DATA

(75) Inventors: Simon Kao, Taipei (TW); Fu-Chang Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 883 days.

(21) Appl. No.: 10/217,289

(22) Filed: Aug. 12, 2002

(65) Prior Publication Data

US 2004/0027592 A1 Feb. 12, 2004

(51) Int. Cl.
*G06K 9/36* (2006.01)

(52) U.S. Cl. .................. 382/232; 382/240; 382/243

(58) Field of Classification Search ............. 382/232, 382/237, 244, 243, 233, 236, 238, 251, 246, 382/240; 709/247; 375/240.21, 240.29; 341/63; 712/213; 345/644; 235/472.01; 358/426.12, 426.01
See application file for complete search history.

(56) References Cited

U.S. PATENT DOCUMENTS

| | | | | |
|---|---|---|---|---|
| 4,463,386 A | * | 7/1984 | Goddard et al. | ....... 358/426.12 |
| 5,454,079 A | * | 9/1995 | Roper et al. | ............... 709/247 |
| 5,459,484 A | * | 10/1995 | Nguyen | ...................... 345/644 |
| 6,653,954 B2 | * | 11/2003 | Rijavec | ...................... 341/63 |
| 6,883,087 B1 | * | 4/2005 | Raynaud-Richard et al. | ......................... 712/213 |

\* cited by examiner

*Primary Examiner*—Anh Hong Do
(74) *Attorney, Agent, or Firm*—Alan D. Kamrath; Nikolai & Mersereau, P.A.

(57) ABSTRACT

A method for reducing data with limited distortion of an image formed of the data includes determining whether reduction of the data is feasible and reducing the data if reduction of the data is feasible. Determining whether reduction of the source data is feasible includes determining whether clipping has been performed. Determining whether reduction of the source data is feasible includes determining whether merging has been performed. Determining whether reduction of the source data is feasible includes determining whether a difference between the width of the source data and the height of the source data is big. Determining whether reduction of the source data is feasible includes determining whether the source data is few. Determining whether reduction of the source data is feasible includes determining whether magnification has been performed. Determining whether reduction of the source data is feasible includes determining whether magnification has been performed and a factor thereof is greater than a predetermined value. Reducing the data includes eliminating lines from the data. Reducing the data includes eliminating columns from the data.

14 Claims, 3 Drawing Sheets

REDUCTION OF DATA WITH LIMITED DISTORTION OF IMAGE FORMED OF THE DATA

DEFINITION

Throughout this specification, the term "width" refers to the number of columns of data and the term "height" indicates the number of lines of data.

BACKGROUND OF INVENTION

1. Field of Invention

The present invention relates to fast and realistic printing and, more particularly, to reduction of data with limited distortion of an image formed of the data.

2. Related Prior Art

A typical printing system includes a printer and a computer. At least one sort of application software and a printer driver are run in the computer. Printer firmware is run in the printer. A print job is formed and rendered in the application software run in the computer page by page. Each page may include at least one graphic object, at least one image object and/or at least one text object. Then, the print job is processed in the printer driver run in the computer. The print job is sent from the computer to the printer through a cable. The print job is processed in the printer firmware run in the printer. Finally, the print job is printed on a destination surface such as the surface of a piece of paper.

Speed and quality are important criteria for evaluating printers. Although dreaming of an ideal printing system that can print well and fast, we often have to sacrifice quality in pursuit of speed, and vice versa. Therefore, what we really do is try to achieve a balance between quality and speed.

Printing time includes rendering time, transferring time and processing time. The rendering time is spent to convert graphic objects, image objects and/or text objects into commands and data. For an image object, the rendering time often includes compression time. The rendering time is substantially dependent on the central processing unit used in the computer and often makes a small portion of the printing time. The transferring time is spent to transfer the commands and data from the computer to the printer through the cable and is substantially determined by the printer driver run in the computer. The transferring time often makes the greatest portion of the printing time. This becomes more apparent when the print job grows larger. To reduce the transferring time, there are several options: reducing the size of the commands and data to be transferred from the computer to the printer through the cable, using a more efficient network transfer protocol and improving the speed of the hardware of the printing system including the printer, the computer and the cable. The processing time is spent to decompress, interpret and realize the commands and data on the destination surface, and is dependent on the printer firmware. To reduce the processing time, there are several options: using a more efficient data-compressing method and a data-reducing method. A lot of effort has been made on reducing the data to be transferred.

Compression is often used to reduce data to be transferred from a computer to a printer through a cable. There are many data-compressing methods such as Tiff and Delta Row. Tiff compresses a line without knowledge of previous lines. Delta Row compares the differences between a line and a previous line. Tiff seems more efficient than Delta Row in compressing non-true-color images or images with gray-scale levels, while Delta Row seems more efficient than Tiff in compressing true-color images and images in which reproduction of a line occurs frequently. To select the best one from several data-compressing methods is important. However, there has not been any method known that can select the best one from several data-compressing methods.

Even if an adequate data-compressing method can be found, the data may still be too large for transmission after compression.

The present invention is therefore intended to obviate or at least alleviate the problems encountered in the prior art.

SUMMARY OF INVENTION

It is the primary objective of the present invention to provide to a method for reducing data with limited distortion of an image formed of the data.

According to the present invention, a method for reducing data with limited distortion of an image formed of the data includes a step of determining whether reduction of the data is feasible and a step of reducing the data if reduction of the data is feasible.

The step of determining whether reduction of the source data is feasible includes a step of determining whether clipping has been performed.

The step of determining whether reduction of the source data is feasible includes a step of determining whether merging has been performed.

The step of determining whether reduction of the source data is feasible includes a step of determining whether a difference between the width of the source data and the height of the source data is big.

The difference is determined to be big if the height is more than five (5) times greater than the width.

The difference is determined to be big if the width is more than five (5) times greater than the height.

The step of determining whether reduction of the source data is feasible includes a step of determining whether the source data is few.

The source data is set to be few if one of the width and the height is less than one hundred and fifty (150).

The step of determining whether reduction of the source data is feasible includes a step of determining whether magnification has been performed.

The step of determining whether reduction of the source data is feasible includes a step of determining whether magnification has been performed and a factor thereof is greater than a predetermined value. The predetermined value may be 1.42 (10/7).

The step of determining whether reduction of the source data is feasible includes a step of determining whether the data is to be compressed by Tiff after reduction, a step of determining whether magnification has been performed if the data is to be compressed by Tiff after reduction, and a step of determining whether magnification has been performed and a factor thereof is greater than a predetermined value if the data is to be compressed by Tiff after reduction.

The step of reducing the data includes a step of eliminating lines from the data.

The step of reducing the data includes a step of eliminating columns from the data.

The data is reduced so that a reduction rate is within a range of 25% to 50%.

Other objectives, advantages, and novel features of the invention will become more apparent from the following detailed description when taken in conjunction with the attached drawings.

BRIEF DESCRIPTION OF DRAWINGS

The present invention will be described through detailed illustration of embodiments referring to the attached drawings wherein.

DETAILED DESCRIPTION OF PREFERRED EMBODIMENT

The method according to the present invention can be implemented in a printing system (not shown) that includes a printer and a computer in communication of data with the printer. At least one application in software and a printer driver are run in the computer. Printer firmware is run in the printer. A print job is formed and rendered in the application software run in the computer page by page. Each page may include at least one graphic object, at least one image object and/or at least one text object. Then, the print job is processed in the printer driver run in the computer. The print job is sent from the computer to the printer through a cable. The print job is processed in the printer firmware run in the printer. Finally, the print job is printed on a destination surface such as the surface of a piece of paper.

Figure 1:
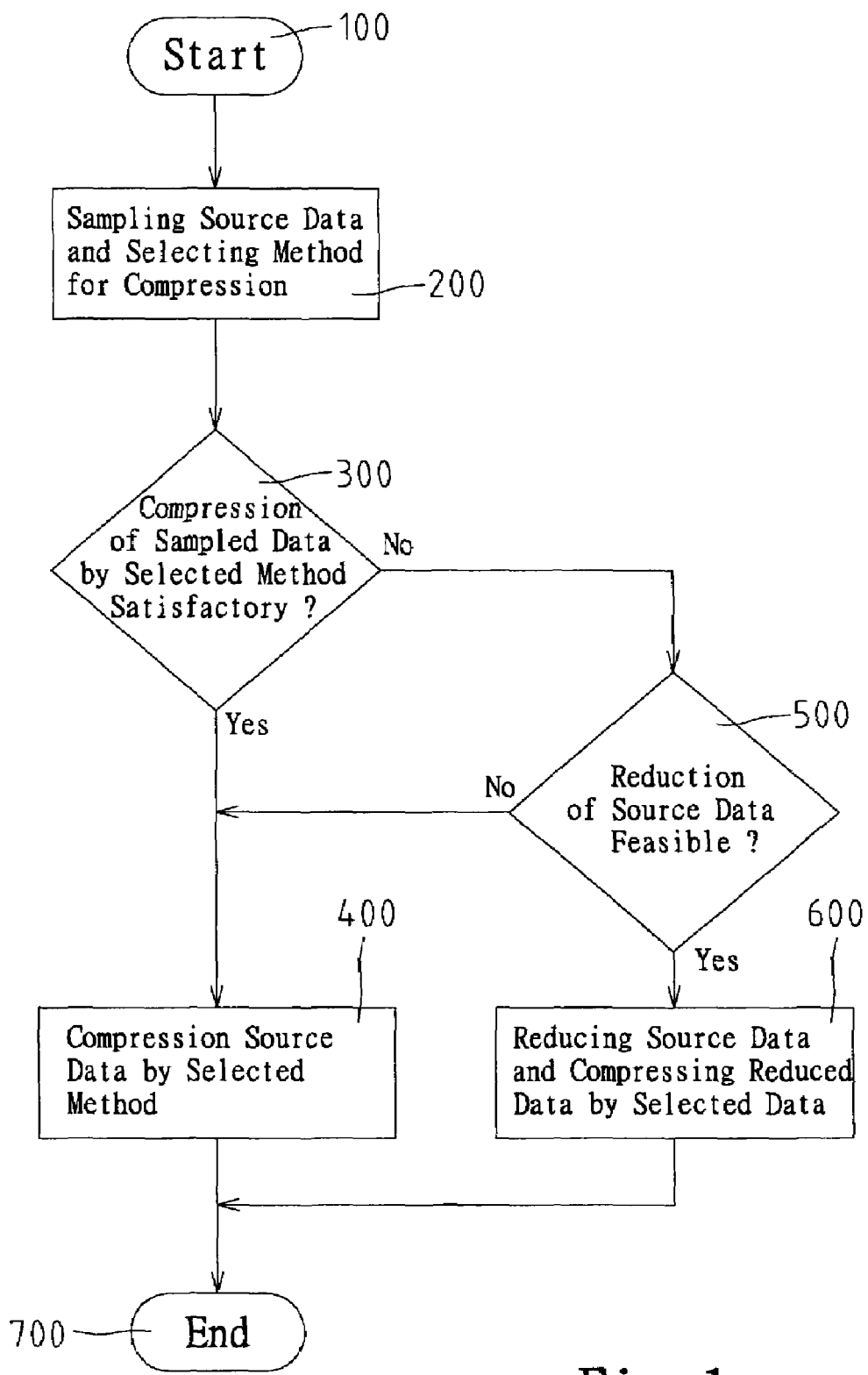
FIG. 1 is a flow chart of a fast and realistic printing method according to the present invention.

FIG. 1 depicts a fast and realistic printing method according to the preferred embodiment of the present invention particularly useful for handling images. At step 100, the routine is initiated when a page of the print includes at least one image object. At step 200, the source data of the at least one image object of the page are sampled so as to provide sample data and the best one is selected from many data-compressing methods such as Tiff and Delta Row. At step 300, it is determined whether compression of the sample data by the selected data-compressing method is satisfactory. The routine goes to step 400 if the compression of the sample data by the selected data-compressing method is satisfactory and goes to step 500 if otherwise. At step 400, the source data is compressed by the selected data-compressing method. At step 500, it is determined whether reduction of the source data is feasible. The routine goes to step 600 if reduction of the source data is feasible and goes to step 400 if otherwise. At step 600, the source data is reduced and compressed by the selected data-compressing method. At step 700, the routine ends.

Although not shown, the routine includes a step of providing source data of an image and a step of providing a number of data-compressing methods.

Figure 2:
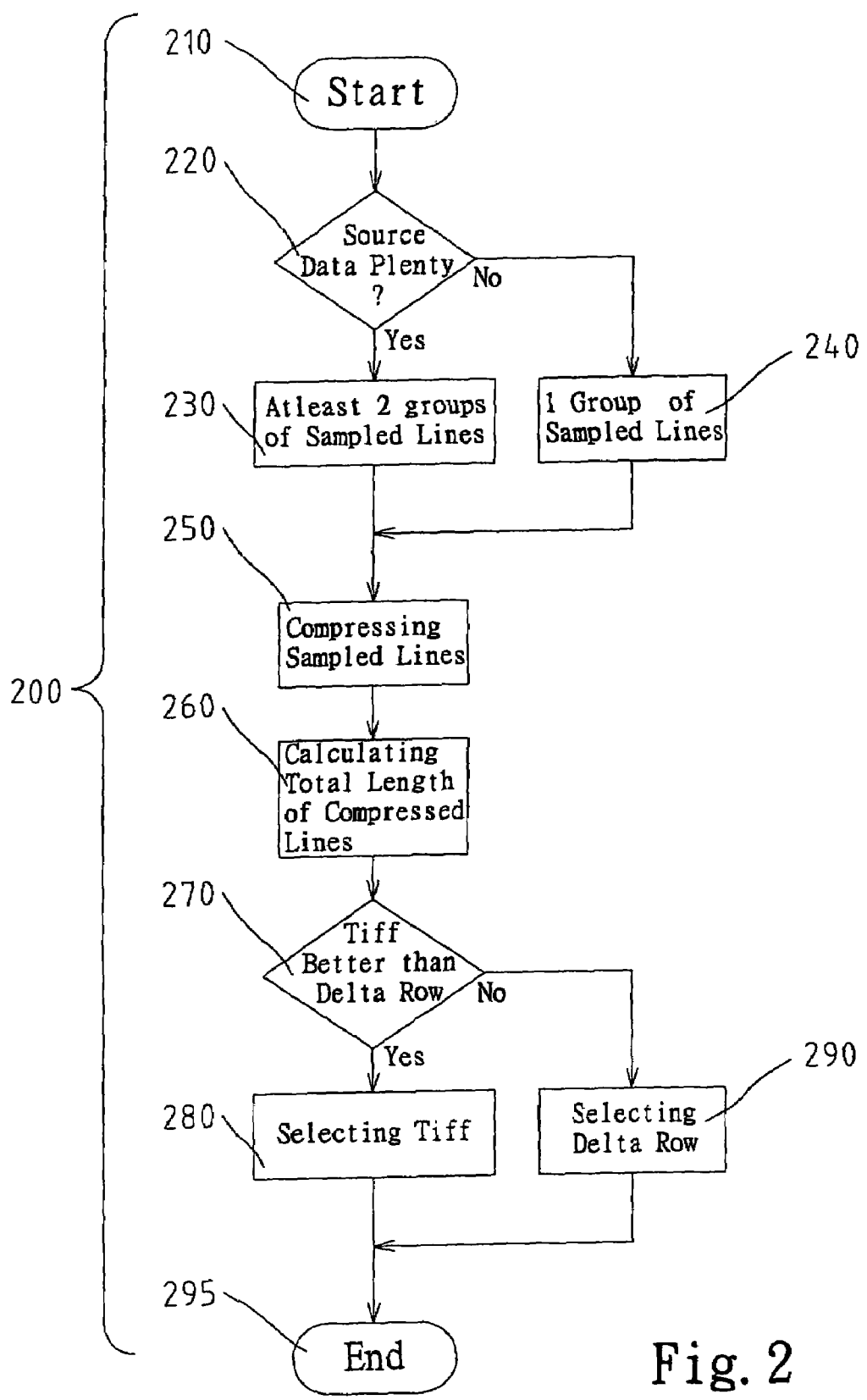
FIG. 2 is a flow chart of a method for selecting one from several data-compressing methods according to the present invention.

Step 200 shown in FIG. 1 is implemented as a subroutine including a plurality of steps as shown in FIG. 2. At step 210, the subroutine is initiated. At step 220, it is determined whether the source data is plenty. The subroutine goes to step 230 if the source data is plenty and goes to step 240 if otherwise. At step 230, at least two groups of at least one line are sampled. At step 240, only one group of at least one line is sampled. At step 250, the groups or the only group is compressed by various data-compressing methods such as Tiff and Delta Row. At step 260, the total lengths of the compressed lines or line by the various data-compressing methods, respectively, are calculated. At step 270, the total lengths are compared with each other in order to determine whether Tiff compresses better than Delta Row. The subroutine goes to step 280 if Tiff compresses better than Delta Row and goes to step 290 if otherwise. At step 280, Tiff is selected. At step 290, Delta Row is selected. The subroutine ends at step 295.

At step 220, it is determined whether the source data are plenty. If the source data include plenty lines, at least two groups of at least one line are sampled in order to adequately represent the total lines. However, the number of the groups that are sampled cannot be too big or it will take too much time to handle the sample lines. Similarly, each sample group cannot include too many lines. If the source data include only a few lines, one sample line can adequately represent the total lines. Preferably, a criterion of ten (10) lines is set for determining whether the source data include plenty lines. Preferably, three (3) groups are sampled if the source data include ten (10) lines or more. The first group is located at the beginning of the source data, the second group the middle of the source data, and the last group the end of the source data. At step 240, only one group of lines is sampled. The only group is located at the center of the source data. Preferably, each of the groups or the only group includes at least one line and preferably two lines.

At step 250, the groups or the only group of lines are compressed by various data-compressing methods such as Tiff and Delta Row. Preferably, only Tiff and Delta Row are used to compress the groups or the only group.

At step 260, the total length of the data compressed via Tiff is calculated, and the total length of the data compressed via Delta Row is calculated, and the total length of the data compressed via any other data-compressing method is calculated.

At step 300, a criterion is set for determining whether compression of the sample data by the selected data-compressing method is satisfactory. Preferably, the criterion is set to be 8%. If the total length of the compressed sample data is no more than 8% of the total length of the sample data before compression, the compression is determined to be satisfactory.

Figure 3:
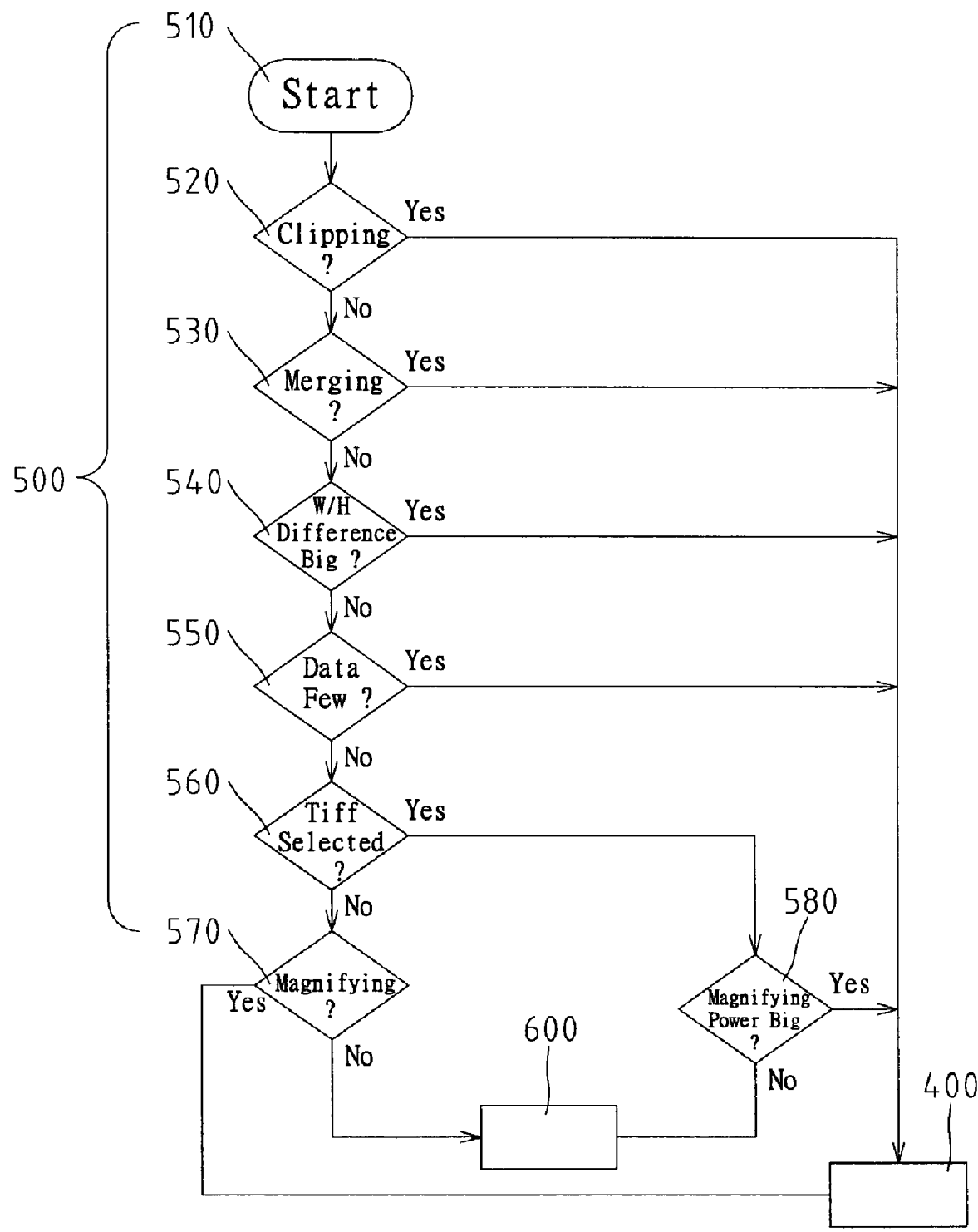
FIG. 3 is a flow chart of a method for determining whether reduction of data is feasible according to the present invention.

Referring to FIG. 3, step 500 shown in FIG. 1 is implemented as a subroutine including a plurality of steps. At step 510, the subroutine is initiated. At step 520, it is determined whether clipping has been performed. The subroutine goes to block 400 if clipping has been performed and goes to step 530 if otherwise. At step 530, it is determined whether merging has been performed. The subroutine goes to block 400 if merging has been performed and goes to step 540 if otherwise. At step 540, it is determined whether a difference between the width of the source data and the height of the source data is big. The subroutine goes to step 400 if the difference between the width of the source data and the height of the source data is big and goes to step 550 if otherwise. At step 550, it is determined whether the source data is few. The subroutine goes to step 400 if the source data is few and goes to step 560 if otherwise. At step 560, it is determined whether Tiff is selected. The subroutine goes to step 570 if Tiff is selected and goes to step 580 if otherwise. At the step 570, it is determined whether magnification has been performed. The subroutine goes to step 400 if magnification has been performed and goes to step 600 if otherwise. At the step 580, it is determined whether magnification has been performed and a factor thereof is greater than a predetermined value. The subroutine goes to step 400 if magnification has been performed and a factor thereof is greater than a predetermined value and goes to step 600 if otherwise.

Before further description of steps 520 to 580, it should be understood that they are intended to avoid observable distortions of the source data. Some of the steps 520 to 580 are related to functions provided by a printer and the others are related to various attributes of the source data. In specific, clipping, merging and magnifying are functions provided by a printer. The difference between the width and height of the source data and the quantity of the source data are obvious different attributes of the source data.

At step 520, it is determined whether clipping has been performed. Clipping is performed when a page of source data is greater than a page of destination surface, regarding width or height. For example, if a page of source data is set to be a letter size page and a page of destination is set to be an A4 page, i.e., the width of the page of the source data is greater than the width of the page of the destination surface, clipping is performed, i.e., some columns of the source data are to be clipped from the page of the source data. It has been learned that distortion would be too obvious to be neglected if more columns and/or lines are eliminated from the source data in the process of reducing according to the present invention after some columns and/or lines have been eliminated from the source data in the process of clipping. Therefore, subroutine goes to block 400 if clipping has been performed and goes to step 530 if otherwise.

At step 530, it is determined whether merging has been performed. Merging means at least two pages of source data are merged into a page of destination surface. To this end, lines and/or columns must be eliminated from each of the pages of the source data. When this occurs, there is no need to enter the stage of reducing according to the present invention due to cost/effectiveness rule. Therefore, the subroutine goes to block 400 if merging has been performed and goes to step 540 if otherwise.

At step 540, it is determined whether a difference between the width of the source data and the height of the source data is big. When the width is much greater than the height, the source data represents a horizontal strip. In this case, eliminating lines from the source data would entail grave distortion of the image. On the contrary, the height may be much greater than the width, i.e., the source data represents a vertical strip. In this case, eliminating columns from the source data would entail grave distortion of the image. Therefore, the subroutine goes to step 400 if the difference between the width of the source data and the height of the source data is big and goes to step 550 if otherwise. Step 540 is particularly important for non-true-color images. Preferably, the image is set to be a vertical strip if the lines are more than five (5) times as many as the columns and a horizontal strip if the columns are more than five (5) times as many as the lines.

At step 550, it is determined whether the source data are few. Due to the consideration of cost vs. effectiveness, there is no need to enter the stage of reducing according to the present invention when the source data are few. Therefore, the subroutine goes to step 400 if the source data are few and goes to step 560 if otherwise. Preferably, the source data is set to be few if they include no more than one hundred and fifty (150) lines or columns. Step 550 is particularly important for true-color images.

Before further description of steps 570 and 580, magnification of an image will be discussed. Magnification of an image may occur in various cases such as where the computer performs magnification under a user's instruction and where the computer automatically performs a function called "fit to page" when the document page including the image is smaller than a destination surface. When magnification occurs, some lines and/or columns of the source data are reproduced, i.e., some of the lines and/or columns of the source data will appear twice. Thus, the source image is distorted. If the non-reproduced lines and/or columns of the source are reduced, i.e., some of the lines and/or columns of the source data will appear twice while some of the some other lines and/or columns of the source data disappear, the source image is further distorted. Therefore, reduction of the source data deserves extra consideration when magnification has been performed.

When the subroutine goes to step 570, Tiff is selected and the image is assumed to be a non-true-color image, and quality loss is NOT so sensitive to image reduction. It has been learned that a non-true-color image is vulnerable to distortion due to reduction of some from the source data after multiplication of some of the source data. Therefore, the subroutine goes to step 400 if magnification has been performed and goes to step 600 if otherwise.

At step 580, Delta is selected and the image is assumed to be a true-color image. A true-color image is not so sensitive to distortion due to reduction after magnification as a non-true-color image. Reduction is feasible as long as a factor of magnification is no greater than a predetermined criterion. Therefore, at step 580, it is determined whether a factor of magnification is greater than a predetermined value. The subroutine goes to step 400 if the factor of magnification is greater than a predetermined value and goes to step 600 if otherwise. Preferably, the criterion for the factor of magnification is set to be about 1.42 (10/7).

Reduction of the source data is conducted in two directions. That is, some lines and columns are eliminated from the source data. During the elimination, the aspect ratio of the source image must be maintained to avoid grave image distortion. The reduction rate is an empirical value. The reduction rate cannot be too high or the quality will be poor. The reduction rate cannot be too low either or it will not be worthy in consideration of cost vs. effectiveness since the reduction of the source data entails overhead. The reduction rate should be within a range of 20%~50% based on different image attributes in order to achieve a balance between speed and quality.

The present invention has been described through detailed illustration of the preferred embodiment. Those skilled in the art can derive many variations from the preferred embodiment without departing from the scope of the present invention. Therefore, the preferred embodiment shall not limit the scope of the present invention. The scope of the present invention is defined in the attached claims.

The invention claimed is:

1. A method for reducing data with limited distortion of an image formed of the data comprising:
   determining whether reduction of the source data is feasible including determining a difference between the width of the source data and the height of the source data;
   reducing the data if reduction of the data is feasible; and
   printing the image on a destination surface according to the data.

2. The data-reducing method according to claim 1 wherein determining whether reduction of the source data is feasible includes determining whether clipping has been performed.

3. The data-reducing method according to claim 1 wherein determining whether reduction of the source data is feasible includes determining whether merging has been performed.

4. The data-reducing method according to claim 1 wherein the difference determined is if the height is more than five (5) times greater than the width.

5. The data-reducing method according to claim 1 wherein the difference determined is if the width is more than five (5) times greater than the height.

6. The data-reducing method according to claim 1 wherein determining whether reduction of the source data is feasible includes determining whether one of a number of columns of the width and a number of lines of the height of the source data is less than one hundred and fifty (150).

7. The data-reducing method according to claim 1 wherein determining whether reduction of the source data is feasible includes determining whether magnification has been performed.

8. The data-reducing method according to claim 1 wherein determining whether reduction of the source data is feasible includes determining whether magnification has been performed and a factor thereof is greater than a predetermined value.

9. The data-reducing method according to claim 8 wherein the factor of magnification determined is if greater than about 1.42 (10/7).

10. The data-reducing method according to claim 1 wherein reducing the data includes eliminating lines from the data.

11. The data-reducing method according to claim 1 wherein reducing the data includes eliminating columns from the data.

12. The data-reducing method according to claim 1 wherein the data are reduced so that a reduction rate is within a range of 25% to 50%.

13. A method for reducing data with limited distortion of an image formed of the data comprising:
    determining whether reduction of the source data is feasible including:
        determining whether the data are to be compressed by Tiff after reduction;
        determining whether magnification has been performed if the data are to be compressed by Tiff after reduction; and
        determining whether magnification has been performed and a factor thereof is greater than a predetermined value if the data are to be compressed by Tiff after reduction;
    reducing the data if reduction of the data is feasible; and
    printing the image on a destination surface according to the data.

14. The data-reducing method according to claim 13 wherein the factor of magnification determined is if greater than about 1.42 (10/7).

* * * * *